(12) United States Patent
Kelley et al.

(10) Patent No.: US 7,659,904 B2
(45) Date of Patent: Feb. 9, 2010

(54) SYSTEM AND METHOD FOR PROCESSING HIGH PRIORITY DATA ELEMENTS

(75) Inventors: Timothy M. Kelley, Orlando, FL (US); Michael G. Silver, Orlando, FL (US)

(73) Assignee: ATI Technologies ULC, Markham, Ontario (CA)

(*) Notice: Subject to any disclaimer, the term of this patent is extended or adjusted under 35 U.S.C. 154(b) by 1135 days.

(21) Appl. No.: 10/408,508

(22) Filed: Apr. 7, 2003

(65) Prior Publication Data

US 2004/0199732 A1 Oct. 7, 2004

(51) Int. Cl.
*G06T 1/60* (2006.01)
*G06T 1/00* (2006.01)

(52) U.S. Cl. .................. 345/530; 345/522; 345/501

(58) Field of Classification Search ......... 345/501–503, 345/535, 531, 530, 558, 522; 710/52–54
See application file for complete search history.

(56) References Cited

U.S. PATENT DOCUMENTS

| | | | | |
|---|---|---|---|---|
| 5,724,154 A | * | 3/1998 | Ito et al. | 358/400 |
| 5,889,779 A | * | 3/1999 | Lincoln | 370/398 |
| 6,055,579 A | * | 4/2000 | Goyal et al. | 713/375 |
| 6,124,868 A | * | 9/2000 | Asaro et al. | 345/558 |
| 6,333,745 B1 | * | 12/2001 | Shimomura et al. | 345/535 |
| 6,560,657 B1 | * | 5/2003 | Gandhi et al. | 710/5 |
| 2002/0199200 A1 | * | 12/2002 | Addington | 725/97 |

OTHER PUBLICATIONS

Breitfelder, Kim; Messina, Don. The Authoritative Dictionary of IEEE Standards Terms. 2000. IEEE Press. Seventh Edition. p. 473.*

* cited by examiner

*Primary Examiner*—Joni Hsu
(74) *Attorney, Agent, or Firm*—Vedder Price P.C.

(57) ABSTRACT

A method and system for accommodating at least one high priority data element from a plurality of data elements written into a ring buffer including a processor that preempts a ring buffer by modifying at least one of the data elements previously written to the ring buffer to create modified data elements in response to detecting a high priority data element to be written into the ring buffer. The processor modifies the plurality of data elements previously written to the ring buffer to create the modified data elements. The processor resubmits to the ring buffer at least one of the data elements corresponding to at least one of the modified data elements for execution by a graphics co-processor in response to processing the at least one high priority data element.

25 Claims, 8 Drawing Sheets

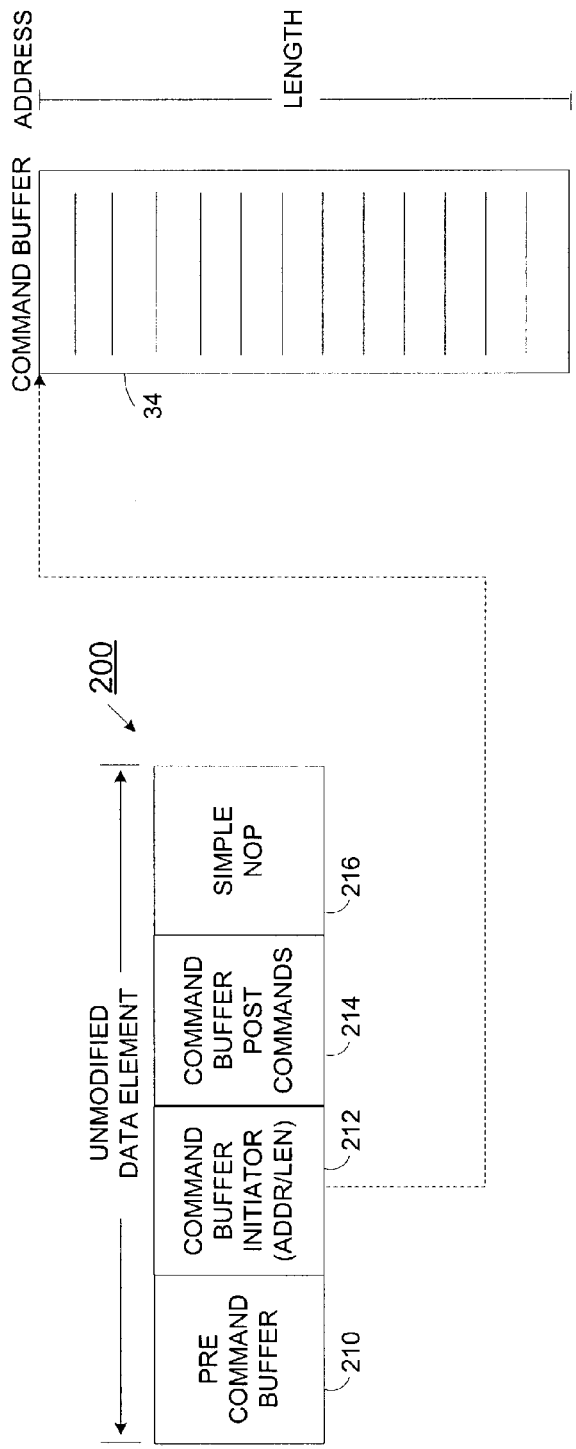
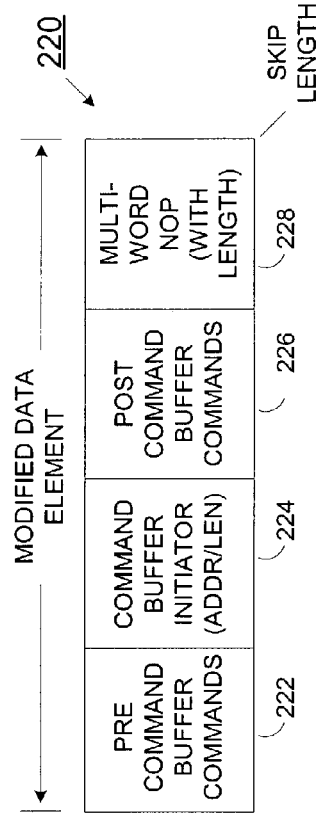
FIGURE 2A
FIGURE 2B

US 7,659,904 B2

SYSTEM AND METHOD FOR PROCESSING HIGH PRIORITY DATA ELEMENTS

FIELD OF THE INVENTION

The invention relates generally to processing commands and more particularly to processing commands between a processor, and co-processor using a ring buffer.

BACKGROUND OF THE INVENTION

A computer, and other devices, are known to include a central processing unit, system memory, video graphics circuitry, audio processing circuitry, and peripheral interface ports. In such devices, the central processing unit functions as a host processor while the video graphics circuit (e.g., a graphics co-processor) functions as a loosely coupled co-processor. In general, the host processor executes applications, and during execution, calls upon the co-processor to execute its particular function. For example, if the host processor requires a drawing operation to be performed, it requests via a data element, (such as a command, instruction, pointer to another command, group of commands or instructions, address, and any data associated with the command), the video graphics co-processor to perform the drawing function through a command delivery system.

Processing systems that include at least one host processor, memory, and at least one co-processor are known to use a ring buffer to facilitate the exchange of commands between the host processors and the co-processor(s). The host processor generates multiple data elements (e.g. commands) that relate to a particular application (for example, graphics application, word processing application, drafting application, presentation application, spreadsheet application, video game application, etc.). The host processor writes data elements into a memory queue which is organized in a ring buffer manner to form a ring buffer queue. As the host processor enters the data elements into the ring buffer, it updates a write pointer sequentially which indicates the most current address of the data element written into the ring buffer. The co-processor reads the data elements from the ring buffer and performs a co-processor function in support of the particular application (i.e. executes the commands). As the co-processor reads data elements from the ring buffer, it sequentially updates a read pointer location which indicates the most recently read data element from the ring buffer, or executed data element. The co-processor and host processor exchange the updated write and read pointer locations as they are updated such that both the co-processor and host processor have current records of the read and write pointer locations. The host processor communicates with the co-processors via a handshaking protocol so that the host processor can continuously provide data elements to the ring buffer for consumption by the co-processor.

However, the co-processor, i.e., graphics processor, can suffer from large latencies in retrieving high priority commands, such as certain graphics rendering commands. This is due in part, because each data element in the ring buffer must be executed sequentially before a subsequent data element, such as before a high priority command may be executed. As a result, the execution of data elements requiring the execution of large sequences of rendering commands stored in the ring buffer, for example, must be processed sequentially in the ring buffer without regard to the relative priority between any new data element (e.g. the high priority command). In the event a high priority command is received by the host processor, current processing systems do not typically allow the insertion of a high priority command in the ring buffer queue ahead of any previously submitted but unprocessed data element sequences. As a result, once a high priority command is received by a host processor, the host processor must insert the high priority command at the end of the ring buffer.

Another system proposes the coordination of processing multiple tasks using cooperative multi-tasking between processors. However, with cooperative multi-tasking, the host processor relies on each application to use the co-processor in a manner that is cooperative with the other applications. Each application controls the amount of time that the co-processor provides to each application. However, since each application controls the amount of time the co-processor dedicates to each application, there is a strong tendency for at least one application to monopolize the co-processor. Further, the host or the co-processor has no means to apply a higher priority to any commands from a particular application relative to any previously submitted commands from another application.

Another method to solve the problem of providing co-processor resources to a high priority application is for the host computer to completely or partially reset the operation of the co-processor whenever a higher priority application requests service from the co-processor. This method will restore the co-processor to its initial power-on state. However, this solution suffers from excessive complexity in the resetting and restoring of the co-processor. This method also suffers from the potential corruption of the application and the operating system environment due to the reset of the co-processor. Further, resetting of the co-processor may result in excessive restoration time.

Also, generally, no-operation data fields "NOP" are known for use in instruction fields of computer commands. However, the modification of a command in a ring buffer queue to include a no-operation data field can present a problem. Although a processor may cause a co-processor to skip execution of commands in a ring buffer queue, the execution of these commands is not performed. As a result, the modification of commands in a ring buffer queue may lead to the corruption of the application or operating system because the execution of commands associated with the application or operating system in the ring buffer is skipped.

BRIEF DESCRIPTION OF THE DRAWINGS

The present invention is illustrated by way of example and not limitation in the accompanying figures in which like reference numerals indicate similar elements and in which:

FIG. 2A illustrates the format of an unmodified data element according to one exemplary embodiment;

FIG. 2B illustrates the data format of a modified data element according to one exemplary embodiment;

DETAILED DESCRIPTION OF A PREFERRED EMBODIMENT

A system for accommodating at least one high priority data element from a plurality of data elements written into a ring buffer, including a processor that preempts a ring buffer by modifying a plurality of data elements previously written to the ring buffer to create modified data elements in response to detecting a high priority data element to be written into the ring buffer. A data element may be a command, instruction, pointer to another command or group of commands or instructions, address, any data associated with the command or any suitable command. The processor resubmits to the ring buffer at least one of the data elements corresponding to at least one of the modified data elements for execution by a graphics co-processor in response to processing the at least one high priority data element.

A method for accommodating at least one high priority data element from the plurality of data elements written into the ring buffer. The processor modifies the plurality of data elements previously written to the ring buffer to create modified data elements in response to detecting a high priority data element to be written into the ring buffer. The processor resubmits to the ring buffer, at least one of the plurality of data elements corresponding to at least one of the modified data elements, for execution by a graphics co-processor, in response to processing the at least one high priority data elements.

Figure 1:
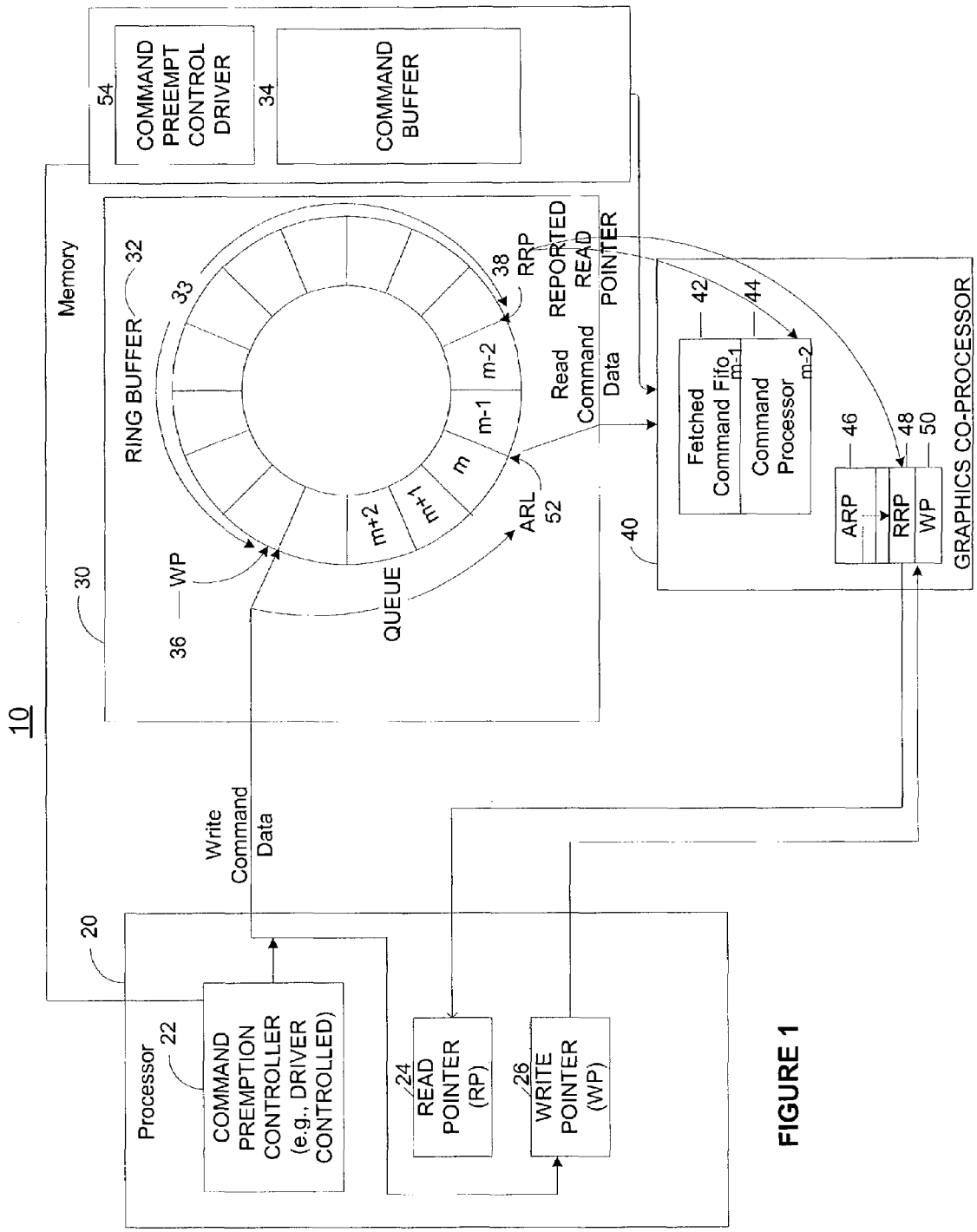
FIG. 1 is a block diagram of a processing system in accordance with one exemplary embodiment.

FIG. 1 is a block diagram of a processing system 10 that includes at least one processor 20, memory 30, and at least one co-processor 40 such as a graphics co-processor or other suitable device. The processor 20 which may be a central processing unit in a computer such as a personal computer, laptop, work station, server or other suitable device includes command preemption controller 22, read pointer register 24 and write pointer register 26. Read pointer register 24 indicates the location where co-processor 40 is reading from the ring buffer 32 and may be a register or part of memory 30. Write pointer register 26 indicates the location where processor 20 writes into ring buffer 32 and may be a register or part of memory 30. Command preemption controller 22, in the embodiment shown is based on the processor executing a software driver to perform the functions described herein. For example, the instructions for executing the software driver may be stored in memory. Alternatively, command preemption controller 22 may be hardware, such as discrete logic or any other suitable combination of hardware, software, or firmware to perform the functions of writing into the ring buffer 32 and performing the preemption functions.

The memory 30 includes a first memory section that is organized as, and herein is referred to as a ring buffer 32, and a second memory section 34 that is organized as a command buffer. The memory 30 may be system memory, local memory to the host processor, local memory to the co-processor, or combination thereof or any other suitable configurations. Such memory may be read only memory, random access memory, floppy disk memory, hard drive memory, magnetic tape memory, CD memory, DVD memory, or any device that stores digital information. The command buffer 34 stores a group of data elements (i.e. commands) that is retrieved and executed by co-processor 40.

As shown, the ring buffer memory section 32 includes a circular memory arrangement wherein one of the entries is identified as being the write pointer location 36 of the ring buffer 32 and the other being the read pointer location 38 of the ring buffer 32. In operation, the processor 20 writes data elements into the ring buffer 32 in a successive order based on the previous write pointer. For example, assume that the current write pointer is pointing to memory location m–2, then, the next memory location that the processor 20 would write a data element into would be location m–1, m, . . . n etc. The processor 20 utilizes the write pointer 36 to determine the clean portion of the ring buffer 32 and the dirty portion of the ring buffer 33. The dirty portion of the ring buffer 33 contains old data (i.e., data elements already processed by the co-processor) and is delineated as the ring buffer entries between the write pointer and the read pointer in a clockwise direction as shown in FIG. 1. The clean data indicates data elements that the processor has written into memory but has not been processed by the co-processor 40. The clean data is delineated as the ring buffer entries between the write pointer and the read pointer in a counter-clockwise direction. As such, if the ring buffer contains no dirty entries, the ring buffer is full. Similarly, if the ring buffer contains no clean data (i.e., the ring buffer contains all dirty entries) the ring buffer is empty.

The co-processor 40, which may be a video graphics co-processor, includes a fetched command FIFO 42, a command processor 44, and a plurality of registers that include an actual read pointer register "ARP" 46, a write pointer register "WP" 50 that stores the write pointer 36, and a reported read pointer register "RRP" 48 that stores the reported read pointer 38. The co-processor 40 is operatively coupled to the processor 20, through a switchable bus structure, and to the ring buffer 30 wherein the processor 20 rewrites preempted data elements previously skipped, into the ring buffer 30 based on the location of the at least one high priority data element in the ring buffer. In one embodiment, the preempted data elements previously skipped are written into the ring buffer 30 after the at least one high priority data elements are written to the ring buffer 30. Co-processor 40 retrieves data elements from the reported read pointer location 38 of ring buffer 32 and stores the fetched data element into fetched command FIFO 42 for subsequent processing by command processor 44. After fetching a data element, co-processor 40 updates the reported read pointer location 38 thereby producing an updated reported read pointer. The updated reported read pointer 38 is stored in reported read pointer location register 48 and provided to processor 20 via a read pointer register 24.

In response to detecting at least one high priority data element to be written into the ring buffer 30, command preemption controller 22 modifies the data elements previously written into ring buffer 32 to create modified data elements. For example, fields, or slots of the current data elements stored in the ring buffer 32 are changed to make a data element a no-operation command further described below. In response to receiving the high priority data element, command preemption controller 22 rewrites into ring buffer 32 at least one of the data elements, previously received, corresponding to the modified data elements in the ring buffer 32. For example, unmodified data elements are rewritten into the ring buffer 32.

Referring to FIGS. 2A and 2B, FIG. 2A illustrates an example of an unmodified data element format 200 according to one exemplary embodiment, and FIG. 2B shows an example of a modified data element 220 where multi-word no-operation data 228 is added to the unmodified data element 200 to form the modified data element 220. The multi-word no-operation data 228 added to the unmodified data element 200 indicates to the command processor 44, when the modified data element 200 is read, to skip execution of the unexecuted modified data element (i.e. skip execution of command in the data element). The command buffer initiator field 224 may direct execution of the command for completion through command buffer 34. For example, the command processor 44, having fetched the data element, determines whether the retrieved data element is for a single instruction, a group of instructions, such as a subroutine, or for additional data. If the retrieved data element refers to additional instructions or data, then the co-processor 40 accesses command buffer 34 to retrieve the additional instructions or data and subsequently performs the additional instructions, or the co-processor 40 retrieves the data. In one embodiment, commands or data contained within the data element may indicate graphics data as part of a 2D or a 3D drawing. The graphics commands and data contained in the data elements would indicate the parameters of the objects being drawn, such as the color information, physical display location, texture mapping information, etc. As the co-processor 30 executes the graphics application, it stores the processed pixel information in command buffer 34, and once a full screen of pixel information has been generated it is provided to a display (not shown).

Figure 3:
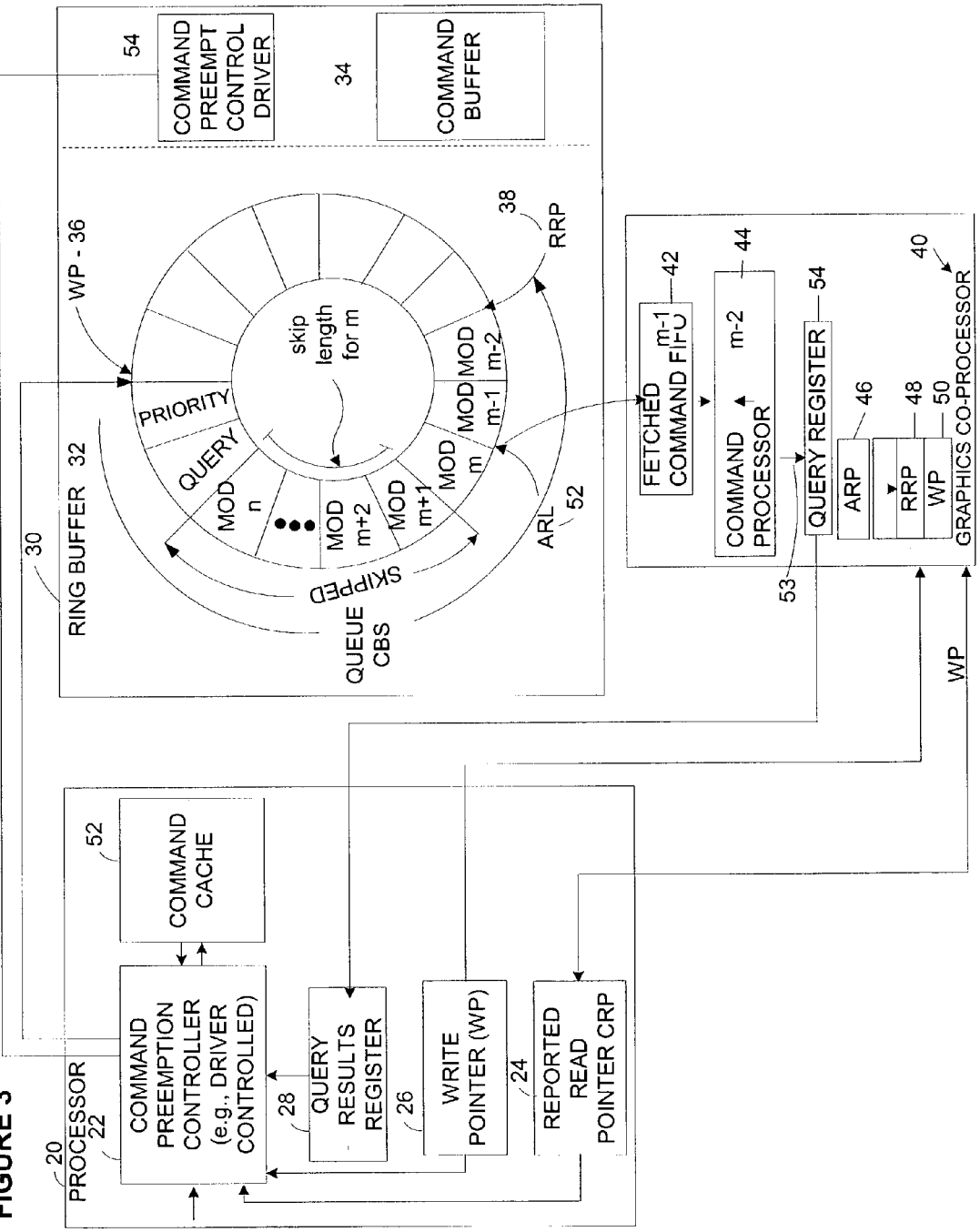
FIG. 3 is a block diagram of the processing system of FIG. 1 with additional detail.

FIG. 3 is a block diagram of the processing system 10 as shown in FIG. 1 after the queued data elements have been modified by the command preemption controller 22. The command preemption controller 22 modifies commands already queued in ring buffer 32 in response to receiving a high priority command. For example, command preemption controller 22 modifies data elements stored in the ring buffer between the reported read pointer 38 and the write pointer 36 to produce modified data elements 220. As shown, since commands m−1, and m−2 have been stored in fetched command FIFO 42 by a command fetcher (not shown) and in command processor 44, commands m−1 and m−2 are referred to as modified executed data elements. Data elements m, m+1, m+2 . . . to n, have not been fetched nor executed and therefore are referred to as modified unexecuted data elements. The command processor 44 is coupled to ring buffer 32 in memory 30 to process at least one modified data element including previously unexecuted modified data elements and previously executed modified data elements. Upon executing a data element, co-processor 40 stores a last executed data element identification 53 into query register 54 in response to the graphics co-processor 40 executing a last executed data element.

In response to reading the modified unexecuted data elements, graphics co-processor 40 skips execution of the previously unexecuted modified data elements (i.e., non-NOP instructions in data elements, m, m+1, m+2, . . . n). After skipping the previously unexecuted modified data elements, graphics co-processor 40 executes the query command. In response to executing the query command by the graphics co-processor 40, the graphics co-processor 40 sends the last executed data element identification 53 stored in query register 54 to command preemption controller 22 of processor 20. In one embodiment, the command preemption controller 22 retrieves the last executed data element by matching the last executed data element identification with the set of submitted data elements previously stored by the command pre-emption controller 22 in command cache 52. Once the command preemption controller 22 identifies the last executed data element in command cache 52, command preemption controller 22 identifies the unexecuted data elements to resubmit for execution by the graphics co-processor 40. The unexecuted data elements are identified as beginning with the next data element after the last executed data element, and ending with the next data element before the query command. The command cache 52 may be any suitable memory on processor 20, or alternatively may be a portion within system memory 30 or any other suitable memory element.

Alternatively, command preemption controller 22 obtains the last executed data element from other methods or means. For example, the last executed command may be sent directly by the command processor 44 to the command preemption controller 22. In yet another alternative embodiment, the command preemption controller 22 may read the query register 54 directly to obtain the last executed data element. In response to the command preemption controller 22 of processor 20 resubmitting into the ring buffer 30 the previously skipped data elements, the graphics co-processor 40 executes these resubmitted data elements in response to executing the high priority data elements.

FIGS. 1 and 3 illustrates a storage medium such as memory RAM, CD ROM, ROM, disc drive, hard drive, distributed server memory i.e. internet web server (i.e. downloaded as needed so as not to be stored permanently) having stored therein instructions executable by a processor to cause the processor or processors such as a controller, CPU, DSP, microprocessor, multi or parallel processors, state machine, discreet logic, to perform the methods described. The instructions in this embodiment describe modifying at least one of the plurality of data elements previously written to a ring buffer to create modified data elements in response to processing at least one of the high priority data elements from at least one of the plurality of data elements written into the ring buffer. The instructions also rewrite at least one of the plurality of data elements corresponding to at least one of the modified data elements into the ring buffer for execution by graphics processor 40.

Figure 4:
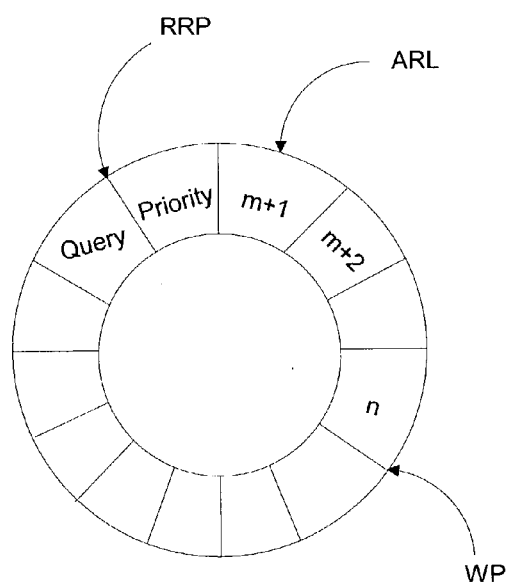
FIG. 4 is a block diagram of the ring buffer according to one exemplary embodiment.

FIG. 4 shows the state of the ring buffer after command preemption control 22 rewrites into the ring buffer 32 the data elements beginning with the next data element (i.e. m) after the last executed data element (i.e. m−1) and ending with a next data element before the query command (i.e. n). In other words, the state of the ring buffer 32 is shown after the query command has been executed and the command preemption controller 22 has resubmitted the data elements from the command cache 52 into ring buffer 32. According to this embodiment, the reported read pointer indicates that the high priority data element has been fetched and is in the process of execution. In this embodiment, the actual read location indicates that the current data element being read is the first resubmitted data element (i.e. the data element m+1). In this embodiment, the write pointer points at the last data element resubmitted into the ring buffer, indicating that all data elements have been resubmitted into the ring buffer and will be executed sequentially as shown in the ring buffer queue. In the event that the ring buffer queue is empty, i.e. the write pointer 36 is equal to the reported read pointer 38, and no modification of the data element in the ring buffer queue is performed.

Figure 5:
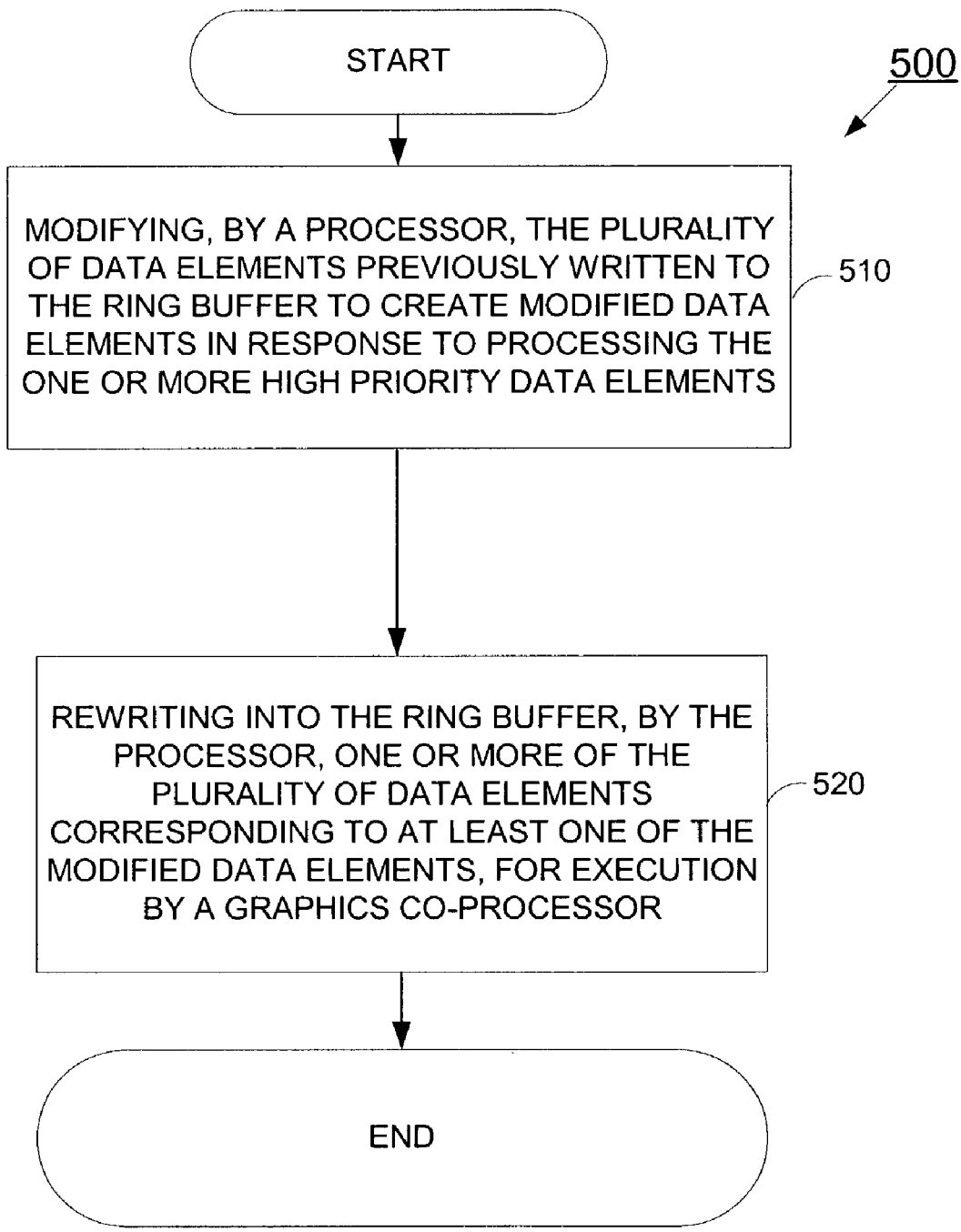
FIG. 5 is a flowchart of a method for accommodating at least one high priority data element according to one exemplary embodiment.

FIG. 5 is a block diagram of a method for accommodating at least one high priority data element from a plurality of received data elements written into ring buffer 32. Command pre-emption controller 22 modifies at least one of the data elements previously written into the ring buffer to create modified data elements in response to detecting a high priority data element to be written into the ring butter as shown at block 510. As previously discussed with respect to FIG. 3, all data elements in the ring buffer queue are modified, even those previously executed data elements (i.e., m−1, m−2) according to this embodiment. For example, command pre-emption controller 22 may modify all data elements stored between the read pointer 24 and the write pointer 26. Since the reported read pointer 38 is stored in read pointer 24, one or more data elements located at the reported read pointer 28 may have been fetched. Nevertheless, modification of a fetched data element will not affect execution of the data element since the data element will be executed as unmodified. The data elements corresponding to those modified data elements in the ring buffer queue that were not previously executed are resubmitted to the ring buffer for execution by graphics processor 40 in response to processing the high priority data elements as shown at block 520.

Figure 6:
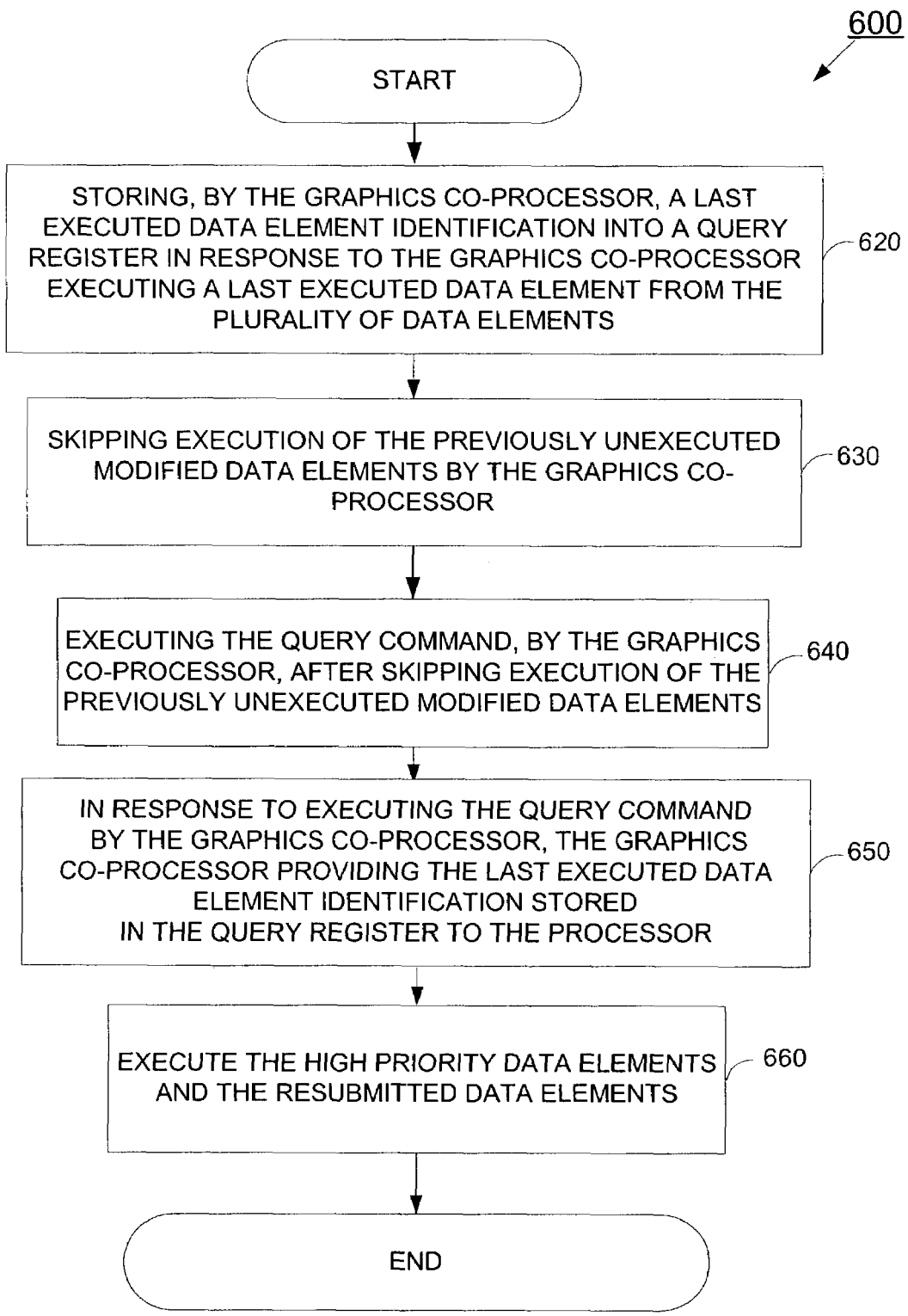
FIG. 6 is a flowchart of a method for processing at least one high priority data element in a ring buffer according to another exemplary embodiment.

FIG. 6 illustrates the processing of the modified data elements shown in FIG. 3 after the command preemption controller 22 modifies the current data elements in the ring buffer 32. Processor 20 stores a last executed data element identification into query results register 28 indicating a last executed data element in response to the graphics co-processor 40 detecting the high priority data element at block 620. In response to modifying at least one of the data elements previously written to the ring buffer 32, graphics co-processor 40 skips execution of the previously unexecuted modified data elements at block 630. According to one embodiment, after skipping execution of the previously unexecuted modified data elements, graphics co-processor 40 executes a command indicating a last executed command at block 640. In response to executing the command indicating a last executed command, graphics co-processor 40 provides the last executed data element identification stored in query register 54 indicating the last executed data element to command preemption controller 22 of processor 20 at block 650. Graphics processor 40 executes the rewritten data element(s) and the high priority data element(s) at block 660.

Although FIGS. 1, 3, and 6 illustrate a use of a query command added to ring buffer by processor 20 in order to cause graphics processor 40 to send the last executed data element to processor 20, other devices according to one embodiment, means or methods may be used. For example, rather than the graphics co-processor 40 providing processor 20 the last executed data element based on the execution of a query command, the graphics processor 40 may provide processor 20 the last executed data element after the execution of each data element. Alternatively, graphics processor 40 could monitor the ring buffer 32 to detect modification of any data elements and as a result, send the last executed data element to processor 20. Other suitable methods and devices may be used as well.

As previously stated with respect to FIGS. 2A and 2B, no-operation data (NOP instructions) may be added to the plurality of data elements to create modified data elements such that graphics processor 40 skips execution of the previously unexecuted modified data elements in response to reading the no-operation data in the previously unexecuted modified data elements. For example, a single data element in the ring buffer may be modified, such as the data element after the last executed data element (i.e., data element m). In this embodiment, a next data element after the last executed data element (i.e. m ) is modified with a no-operation with skip length to indicate the number of data elements to be skipped via a skip length 228 as shown in FIG. 2B so that the read pointer is directed to read the query command. Accordingly, after the first no-operation with skip length is read by the command processor 44, the remaining data elements are skipped by the command processor 44. Alternatively, the skip length may be based on the number of words, or multi-words, so that the skip length may be a single data element.

Yet another alternative, is to modify a data element with a simple no-operation to indicate that the data element is skipped. In this embodiment, each data element that is modified with a simple no-operation is read by the command processor 44. However the data element(s)modified with the simple no-operation is not executed, but rather, command processor 44 skips execution. Accordingly, processing of the simple no-operation may be considered as not executing the simple no-operation since the simple no-operation indicates to the command processor 44 to not take any action. Other suitable devices and methods may be used as well in order to indicate to graphics processor 40 that a data element should be skipped.

As previously stated, if the queue is empty, i.e. the reported read pointer 38 and the write pointer 36 are equal, then the queue is empty and no modification of the data elements in the ring buffer 32 is required. No modification to the data elements in ring buffer 32 is required because since the queue is empty, a command including a high priority command will be immediately executed upon submission to the ring buffer 32 by the processor 22.

Figure 7:
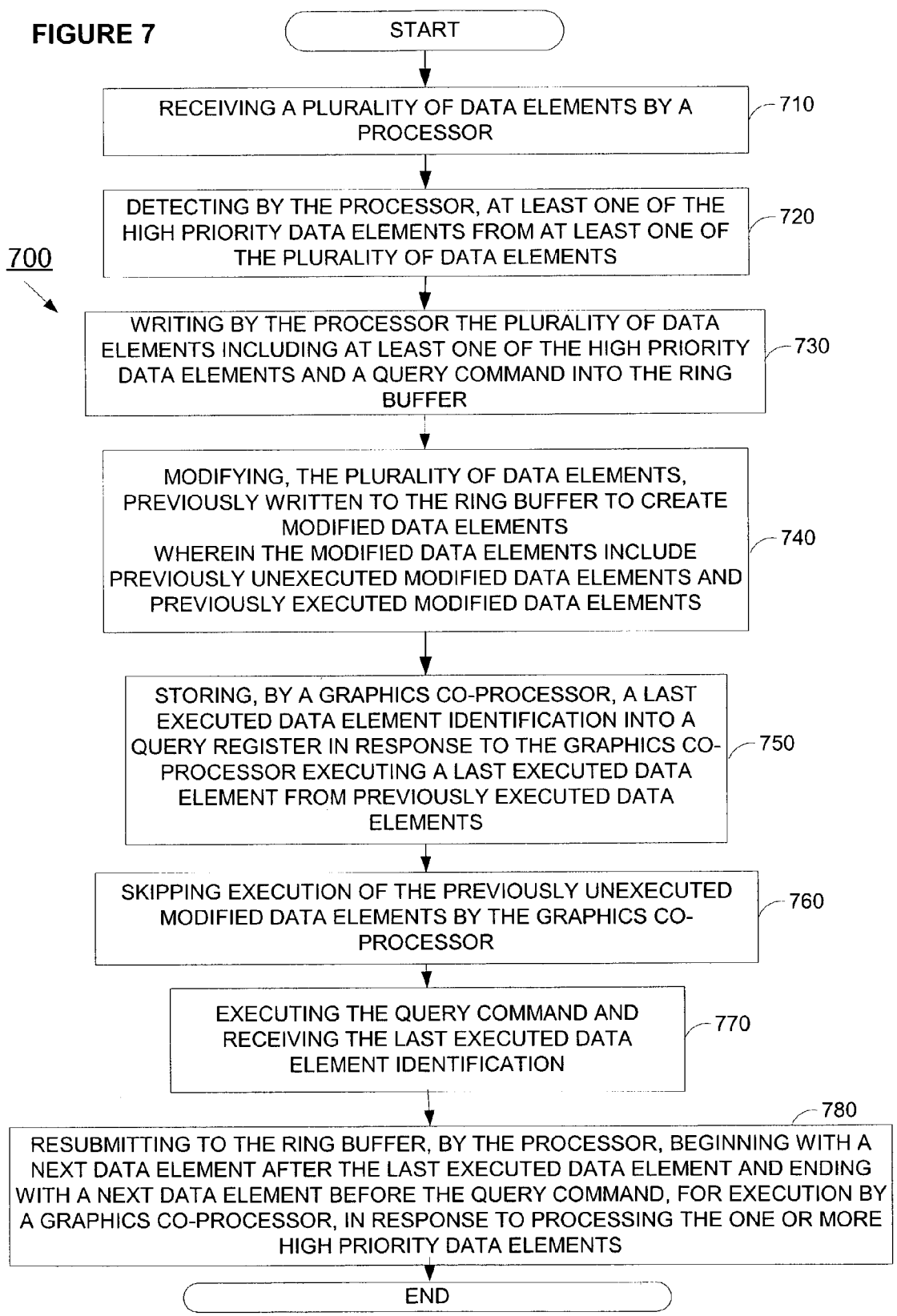
FIG. 7 is a flowchart of a method for processing at least one high priority data element in a ring buffer according to yet another exemplary embodiment.

FIG. 7 is a flowchart for a method of processing at least one high priority data element in a ring buffer 32. At block 710, processor 20 receives multiple data elements. For example, command pre-emption controller 22 detects at least one high priority data element from the received data elements. In this embodiment, command pre-emption controller 22 writes the data elements including at least one of the high priority data elements and a query command into ring buffer 32 at block 730. In response to detecting at least one of the high priority data elements to be written into the ring buffer 32, command pre-emption controller 22 modifies the data elements previously written to the ring buffer 32 to create modified data elements at step 740. As previously described according to one embodiment, all data elements in the ring buffer 32 are modified except the priority command, including those data elements yet to be fetched and executed as well as the data elements already fetched and executed in one embodiment. However, since the modification of those data elements occurs after those already fetched and executed are modified data elements were fetched, the modification does not effect the execution of those already fetched data elements. Alternatively, only the unexecuted or un-fetched data elements are modified by detecting the unexecuted data elements.

The number of data elements modified will depend on the actual size of the queue. For example, as determined by the reported read pointer location 38 of the ring buffer and the write pointer location 36 of the ring buffer, if command pre-emption controller 22 writes data elements into ring buffer 32 faster than graphics processor 40 can read the data elements queued in the ring buffer, then the queue size will begin to increase. Conversely, if command pre-emption controller 22 writes data elements into ring buffer 32 more slowly than graphics co-processor 40 can read from ring buffer 32, then the size of the queue will begin to decrease.

Graphics co-processor 40 stores the last executed data element identification 53 into query register 54 in response to graphics co-processor 40 executing a last executed data element (such as data element m-1 shown in FIG. 3) from previously executed data elements at block 750. According to this embodiment, the graphics processor 40 stores a unique identification for each data element executed in command processor 44 by storing a corresponding data element identification into query register 54. In this embodiment, modified data elements do not cause command processor 44 to store a unique identification into query register 54, thus preserving the last executed data element in query register 54 (such as data element m-1). As a result, query register 54 maintains the unique identification for the last executed data element as fetched command FIFO 42 fetches modified elements and (i.e. m, m+1, m+2, . . . n). Accordingly, graphics co-processor 40 skips execution of the previously unexecuted modified data element at block 760.

According to the data formats described as shown in FIGS. 2A and 2B, command processor 44 processes modified data elements (such as data elements m, m+1, m+2, . . . n) by reading the commands in the data format such as shown in FIG. 2B. For example, command processor 44 reads the data fields: pre-command buffer commands 222, command buffer initiator 224, post command buffer commands 226, and multi-word no operation with length 228. As previously described according to one embodiment, the command processor 44 upon reading the last field indicating a multi-word no-operation with length 228, ignores the commands within this data element and skips to the modified data element as specified by the length value of the multi-word no-operation with length 228 field.

The graphics co-processor 40 executes the query command after skipping execution of the previously unexecuted modified data elements. In response to executing the query command, the graphics co-processor 40 receives the last executed data element information from the graphics co-processor 40 at block 770. As previously described, this data element identification of the last executed data element provides sufficient information for command preemption controller 22 to determine the point at which data elements were not executed when execution of the data elements in the ring buffer queue were pre-empted. In response to receiving the last executed data element identification, from query results 54, command pre-emption controller 22 resubmits at block 780 to the ring buffer 32, beginning with a next data element after the last executed data element m (where the last executed data element is m−1) and ending with a next data element before the query command (data element n).

In one embodiment, the re-submitted data elements may be written to ring buffer while the high priority command is being executed, after the high priority command is executed, or before the high priority command is executed at 780. In another embodiment, the command preemption controller 22 re-submits the data elements into ring buffer 32 in any order including first to last, last to first, starting with the middle and filling outward, or any other order.

Figure 8:
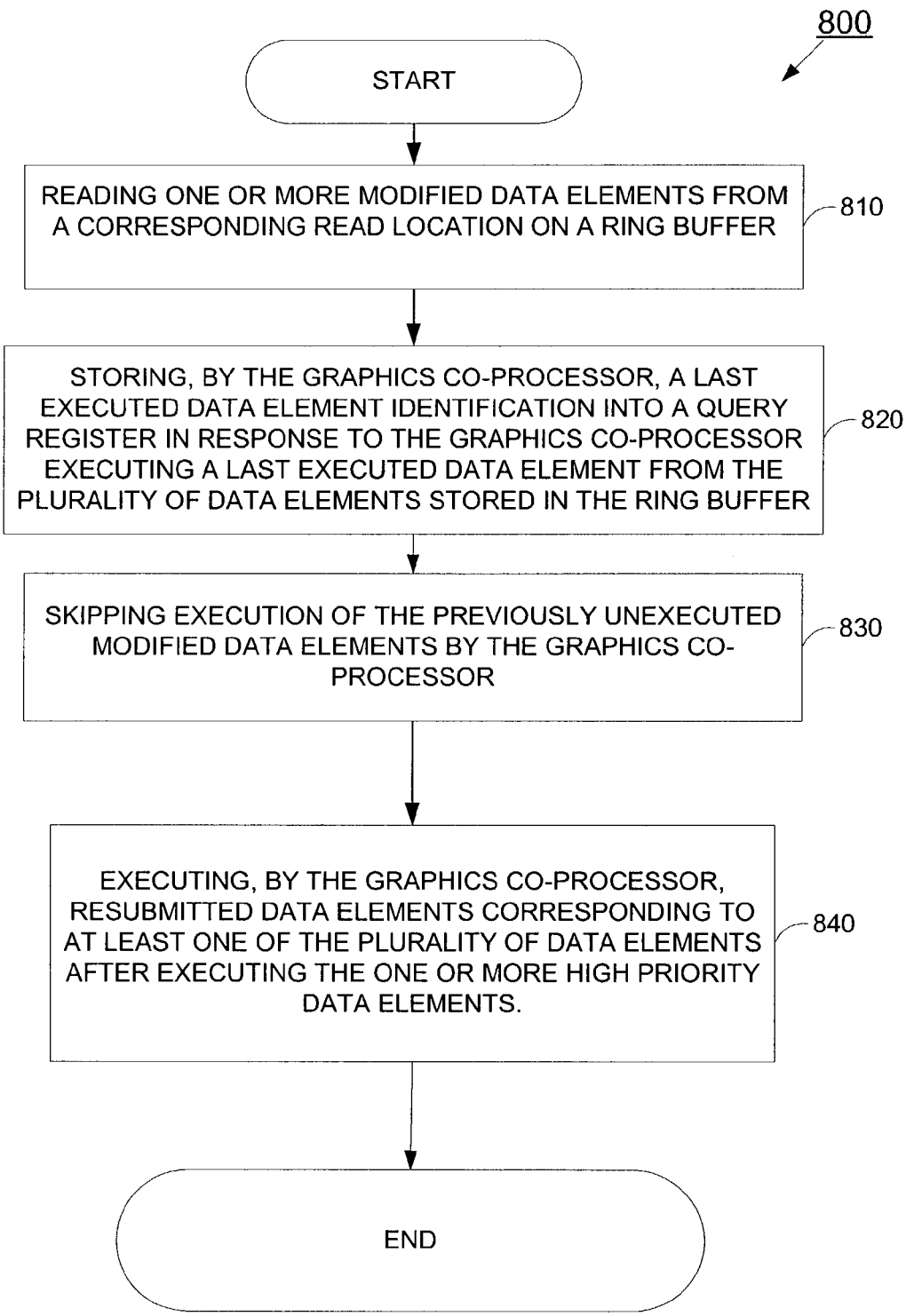
FIG. 8 is a flowchart of a method for processing at least one high priority data element from a plurality of data elements in a graphics co-processor according to an exemplary embodiment.

FIG. 8 illustrates a flow chart for a method 800 of processing at least one of the high priority data elements from a plurality of data elements in a graphics co-processor 40. Graphics co-processor 40 reads at least one of the modified data elements from a corresponding read location on a ring buffer 32 wherein at least one of the modified data elements include previously unexecuted modified data elements and previously executed modified data elements at block 810. Graphics processor 40 stores a last executed data element identification into a query register 54 in response to the graphics co-processor executing a last executed data element from the plurality of data elements stored in the ring buffer at block 820. Graphics co-processor 40 skips execution of the previously unexecuted modified data elements at block 830. Graphics co-processor 40 executes resubmitted data elements corresponding to at least one of the plurality of data elements after executing at least one of the high priority data elements at block 840.

After executing the previously unexecuted modified data elements, graphics co-processor 40 executes a query command stored in the ring buffer 32. In response to executing the query command, graphics co-processor 40 sends the last executed data element identification to processor 20. The data elements are resubmitted beginning with the next data element after the last data element executed by the graphics processor 40 and end with a next data element before the query command. As previously stated, the re-submitted data elements are resubmitted beginning with a next data element after the last data element executed by the graphics processor and ends with a next data element before the query command.

It should be understood that the implementation of other variations and modifications of the invention in its various aspects will be apparent to those of ordinary skill in the art, and that the invention is not limited by the specific embodiments described. For example, methods of determining the last executed command by the graphics co-processor may be determined by, for example, sending the last executed data element identification from the query register to the query results register 28 after executing each data element without the submitting a query instruction into the ring buffer for execution by the graphics co-processor. It is therefore contemplated to cover by the present invention, any and all modifications, variations, or equivalents that fall within the spirit and scope of the basic underlying principles disclosed and claimed herein.

We claim:

1. A method for accommodating at least one high priority data element from a plurality of data elements written into a ring buffer comprising:

modifying, by a processor, a plurality of data elements previously written to the ring buffer to create modified data elements in response to detecting a high priority data element to be written into the ring buffer;

resubmitting to the ring buffer, by the processor, at least one of the plurality of data elements corresponding to at least one of the modified data elements, for execution by a graphics co-processor, in response to processing the at least one high priority data element; and wherein at least one of the modified data elements includes a previously unexecuted modified data element and a previously executed modified data element, and wherein the method includes:

storing, by the graphics co-processor, a last executed data element identification into a register indicating a last executed data element in response to the graphics co-processor executing the previously executed modified data element;

skipping execution of the previously unexecuted modified data elements by the graphics co-processor in response to modifying at least one of the plurality of data elements previously written to the ring buffer;

executing a command indicating the last executed command, by the graphics co-processor, after skipping execution of the previously unexecuted modified data elements;

in response to executing the command indicating the last executed command, by the graphics co-processor, the graphics co-processor providing the last executed data element identification stored in the register indicating the last executed data element for resubmitting to the ring buffer, by the processor; and executing, by the graphics co-processor, the resubmitted data elements in response to skipping execution of the previously unexecuted modified data elements by the graphics co-processor.

2. The method of claim 1 including: executing, by the graphics co-processor, the high priority data elements in response to skipping execution of the previously unexecuted modified data elements by the graphics co-processor.

3. The method of claim 1 wherein modifying, by the processor, the plurality of received data elements previously written to the ring buffer to create modified data elements in response to detecting the high priority data element to be written into the ring buffer includes:
  adding no-operation data to the plurality of data elements to create the modified data elements; and
  wherein the graphics co-processor skips execution of the previously unexecuted modified data elements in response to reading the no-operation data in the previously unexecuted modified data elements.

4. The method of claim 1 wherein modifying, by the processor, a plurality of received data elements previously written to the ring buffer to create modified data elements in response to detecting the high priority data element to be written into the ring buffer includes:
  adding multi-word no-operation data to each data element after the last executed data element with skip length pointing to the query command to create the modified data elements; and
  wherein the graphics co-processor skips execution of the previously unexecuted modified data elements in response to reading the multi word no-operation data with the skip length in one of the previously unexecuted modified data elements.

5. The method of claim 1 wherein the graphics co-processor includes a read pointer location on the ring buffer selected from the group consisting of, a reported read location, and an actual read location, and wherein modifying, by the processor, the plurality of data elements previously written to the ring buffer to create modified data elements in response to detecting a high priority data element to be written into the ring buffer includes:
  providing from the graphics co-processor, the read pointer location;
  obtaining a write pointer location on the ring buffer from the processor; and
  if the write pointer location and the read pointer location are equal, then not modifying by the processor, the plurality of data elements previously written to the ring buffer.

6. The method of claim 1 wherein resubmitting to the ring buffer, by the processor, at least one of the plurality of data elements corresponding to at least one of the modified data elements, for execution by a graphics co-processor, in response to processing the at least one high priority data elements includes:
  resubmitting into the ring buffer the plurality of data elements beginning with a next data element after the last executed data element and ending with a next data element before the at least one high priority data elements.

7. A method for processing at least one high priority data element in a ring buffer comprising:
  receiving a plurality of data elements by a processor;
  detecting, by the processor, the at least one of high priority data element from the plurality of the received data elements;
  writing, by the processor, the plurality of data elements, including at least one of the high priority data elements, and a query command into the ring buffer;
  modifying, in response to detecting at least one of the high priority data elements to be written into the ring buffer, the plurality of data elements, previously written to the ring buffer to create modified data elements;
  wherein the modified data elements include previously unexecuted modified data elements and previously executed modified data elements;
  storing, by a graphics co-processor, a last executed data element identification into a query register in response to the graphics co-processor executing the last executed data element from previously executed modified data elements;
  skipping execution of the previously unexecuted modified data elements by the graphics co-processor;
  executing the query command, by the graphics co-processor, after skipping execution of the previously unexecuted modified data elements;
  in response to executing the query command by the graphics co-processor, receiving the last executed data element identification from the graphics co-processor; and
  in response to receiving the last executed data element identification, resubmitting to the ring buffer, by the processor, beginning with a next data element after the last executed data element and ending with a next data element before the query command, for execution by a graphics co-processor.

8. The method of claim 7 including:
  obtaining a write pointer location of the ring buffer by the processor;
  obtaining a read pointer location of the ring buffer, selected from the group consisting of a reported read location, and an actual read location;
  executing, by the graphics co-processor, the at least one high priority data element in response to skipping execution of the previously unexecuted modified data elements by the graphics co-processor; and
  executing, by the graphics co-processor, the resubmitted data elements.

9. The method of claim 7 wherein modifying, in response to detecting at least one of the high priority data elements to be written into the ring buffer, the plurality of data elements, previously written to the ring buffer to create modified data elements includes:
  adding multi word no-operation data to each data element after the last executed data element with a skip length pointing to the query command to create the modified data elements; and
  wherein the graphics co-processor skips execution of the previously unexecuted modified data elements in response to reading the multi word no-operation data with skip length in one of the previously unexecuted modified data elements.

10. A storage medium having stored therein instructions executable by a processor that causes the processor to:
  modify at least one of a plurality of data elements previously written to a ring buffer to create modified data elements in response to processing high priority data elements from at least one of a plurality of data elements written into the ring buffer; and
  rewrite at least one of the plurality of data elements corresponding to at least one of the modified data elements into the ring buffer for execution by a graphics processor;
  wherein at least one of the modified data elements include previously unexecuted modified data elements and previously executed modified data elements, and wherein the at least one high priority data element includes a query command,
  wherein the graphics co-processor stores a last executed data element identification into a query register in response to the graphics co-processor executing a last executed data element selected from the plurality of data elements,
  wherein the graphics co-processor skips execution of the previously unexecuted modified data elements, wherein the graphics co-processor executes the query command after executing the previously unexecuted modified data elements, and in response to executing the query command by the graphics co-processor, the graphics co-processor provides the last executed data element identification to the processor, wherein the graphics co-processor executes the rewritten data elements in response to executing the high priority data elements.

11. The storage medium of claim 10 wherein at least one of the plurality of data elements are modified by adding no-operation data to the at least one of the plurality of data elements to create the modified data elements, wherein the graphics co-processor skips execution of the previously unexecuted modified data elements in response to reading the no-operation data in the previously unexecuted modified data.

12. The storage medium of claim 10 wherein at least one of the plurality of data elements are modified by adding multi-word no-operation data to each data element after the last executed data element with skip length pointing to the query command stored in the ring buffer to create the modified data elements, wherein the graphics co-processor skips execution of the previously unexecuted modified data elements in response to reading the multi-word no-operation data with skip length pointing to the query command stored in the ring buffer.

13. A method of processing at least one high priority data element from a plurality of data elements in a graphics co-processor comprising:

reading at least one modified data element from a corresponding read location on a ring buffer, wherein the at least one modified data element includes previously unexecuted modified data elements and previously executed modified data elements;

storing, by the graphics co-processor, a last executed data element identification into a query register in response to the graphics co-processor executing a last executed data element from the plurality of data elements stored in the ring buffer;

skipping execution of the previously unexecuted modified data elements by the graphics co-processor; and executing, by the graphics co-processor, resubmitted data elements corresponding to at least one of the plurality of data elements after executing the at least one high priority data element.

14. The method of claim 13 comprising:

executing a query command stored in the ring buffer, by the graphics co-processor, after executing the previously unexecuted modified data elements;

sending the last executed data element identification to a processor in response to executing the query command wherein the query results include a unique identifier that identifies the last data element executed by the graphics processor; and wherein the resubmitted data elements begin with a next data element after the last data element executed by the graphics processor, and end with a next data element before the query command.

15. The method of claim 13 comprising:

receiving, from a processor, a write pointer location on the ring buffer;

receiving a read pointer location on the ring buffer indicating a location in the ring buffer where the graphics co-processor reads a data element; and wherein if the write pointer location and the read pointer location are equal, then the graphics processor does not read the at least one modified data element.

16. The method of claim 13 wherein the modified data blocks include no-operation data, and wherein the step of skipping execution of the previously unexecuted modified data elements occurs in response to the graphics co-processor reading the no-operation data in at least one of the modified data elements, and skipping at least one of the modified data blocks until the query command is read.

17. A system for processing at least one high priority data element from a plurality of data elements comprising:

memory including a ring buffer;

at least one processor operably coupled to the ring buffer to modify at least one of the plurality of data elements previously written to the ring buffer to create modified data elements in response to detecting the at least one high priority data elements to be written into the ring buffer;

at least one graphics co-processor operably coupled to the processor and to the ring buffer, wherein the processor re-submits into the ring buffer, at least one of the plurality of data elements corresponding to at least one of the modified data elements, for execution by the graphics co-processor in response to processing the at least one high priority data elements;

wherein at least one of the modified data elements include previously unexecuted modified data elements and previously executed modified data elements, and wherein the at least one high priority data element includes a query command, wherein the graphics co-processor stores a last executed data element identification into a query register in response to the graphics co-processor executing a last executed data element selected from the plurality of data elements, wherein the graphics co-processor skips execution of the previously unexecuted modified data elements, wherein the graphics co-processor executes a query command after executing the previously unexecuted modified data elements, and in response to executing the query command by the graphics co-processor, the graphics co-processor provides the last executed data element identification to the processor, wherein the graphics co-processor executes the resubmitted data elements in response to executing the high priority data elements.

18. The system of claim 17 wherein at least one of the plurality of data elements are modified by adding no-operation data to the at least one of the plurality of data elements to create the modified data elements, wherein the graphics co-processor skips execution of the previously unexecuted modified data elements in response to reading the no-operation data in the previously unexecuted modified data.

19. A system for processing at least one high priority data element from a plurality of data elements comprising:

memory including a ring buffer;

at least one processor operably coupled to the ring buffer to modify at least one of the plurality of data elements previously written to the ring buffer to create modified data elements in response to detecting the at least one high priority data elements to be written into the ring buffer; and at least one graphics co-processor operably coupled to the processor and to the ring buffer, wherein the processor re-submits into the ring buffer, at least one of the plurality of data elements corresponding to at least one of the modified data elements, for execution by the graphics co-processor in response to processing the at least one high priority data elements;

wherein at least one of the plurality of data elements are modified by adding multi-word no-operation data with skip length to each data element previously written to the ring buffer, to create the modified data elements, wherein the skip length for each data element points to the query command in the ring buffer, wherein the graphics co-processor skips execution of the previously unexecuted modified data elements in response to reading the multi-word no-operation data with skip length pointing to the query command stored in the ring buffer.

20. A system for processing at least one high priority data element from a plurality of data elements comprising:

memory including a ring buffer;

at least one processor operably coupled to the ring buffer to modify at least one of the plurality of data elements previously written to the ring buffer to create modified data elements in response to detecting the at least one high priority data elements to be written into the ring buffer;

at least one graphics co-processor operably coupled to the processor and to the ring buffer, wherein the processor re-submits into the ring buffer, at least one of the plurality of data elements corresponding to at least one of the modified data elements, for execution by the graphics co-processor in response to processing the at least one high priority data elements; and wherein the processor re-writes into the ring buffer at least one of the plurality of data elements corresponding to at least one of the modified data elements, beginning with the data element after the last executed data element and ending with the data element before the query command.

21. A system for processing at least one high priority data element from a plurality of data elements comprising:

memory including a ring buffer;

at least one processor operably coupled to the ring buffer to modify at least one of the plurality of data elements previously written to the ring buffer to create modified data elements in response to detecting the at least one high priority data elements to be written into the ring buffer; and at least one graphics co-processor operably coupled to the processor and to the ring buffer, wherein the processor re-submits into the ring buffer, at least one of the plurality of data elements corresponding to at least one of the modified data elements, for execution by the graphics co-processor in response to processing the at least one high priority data elements;

wherein the ring buffer comprises:

a read pointer location of the ring buffer to indicate a graphics co-processor read instruction selected from the group consisting of a reported read location, and an actual read location;

a write pointer location of the ring buffer from the processor;

if the write pointer location and the read pointer location are equal, then to not modify the at least one of the plurality of data elements previously written to the ring buffer.

22. A graphics co-processor for processing at least one high priority data element from a plurality of data elements comprising:

a command processor, operably coupled to memory, wherein the memory includes a ring buffer, to process at least one modified data element including previously unexecuted modified data elements and previously executed modified data elements, the command processor operating to:

store a last executed data element identification into a query register in response to executing a last executed data element from the plurality of data elements stored in the ring buffer;

skip execution of the previously unexecuted modified data elements; and execute data elements resubmitted by a processor, wherein the resubmitted data elements correspond to at least one of the plurality of data elements after executing the at least one high priority data elements.

23. The graphics co-processor of claim 22 wherein the command processor operates to:

execute a query command previously stored in the ring buffer, by the graphics co-processor, after executing the previously unexecuted modified data elements;

send the last executed data element identification to a processor in response to executing the query command wherein the query results include a unique identifier that identifies the last data element executed by the graphics processor;

wherein the resubmitted data elements begin with a next data element, after the last data element executed by the graphics processor, and end with a next data element located before the query command.

24. The graphics co-processor of claim 22 wherein the command processor operates to:

receive a write pointer location in the ring buffer from a processor; receive a read pointer location on the ring buffer indicating a location in the ring buffer where the graphics co-processor reads a data element; and wherein if the write pointer location and the read pointer location are equal, then the graphics processor does not process the at least one modified data element.

25. The graphics co-processor of claim 22 wherein the previously unexecuted modified data elements include no-operation data, wherein the command processor skips execution of the previously unexecuted modified data elements in response to the command processor reading the no-operation data in the modified data blocks, and wherein modified data elements are skipped until the query command is read.

* * * * *